(12) United States Patent
Youn et al.

(10) Patent No.: US 12,550,588 B2
(45) Date of Patent: Feb. 10, 2026

(54) ADHESIVE MEMBER AND DISPLAY APPARATUS INCLUDING THE SAME

(71) Applicant: LG Display Co., Ltd., Seoul (KR)

(72) Inventors: Yeoo Youn, Paju-si (KR); MiKyung Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 607 days.

(21) Appl. No.: 17/403,720

(22) Filed: Aug. 16, 2021

(65) Prior Publication Data
US 2022/0204815 A1     Jun. 30, 2022

(30) Foreign Application Priority Data

Dec. 31, 2020   (KR) .................. 10-2020-0190026

(51) Int. Cl.
| | | |
|---|---|---|
| *C09J 7/38* | (2018.01) | |
| *C09J 11/04* | (2006.01) | |
| *H10K 59/80* | (2023.01) | |
| *H10K 59/12* | (2023.01) | |

(52) U.S. Cl.
CPC ............ *H10K 59/872* (2023.02); *C09J 7/385* (2018.01); *C09J 11/04* (2013.01); *C09J 2203/326* (2013.01); *C09J 2301/408* (2020.08); *C09J 2301/414* (2020.08); *C09J 2409/00* (2013.01); *C09J 2433/00* (2013.01); *H10K 59/12* (2023.02); *H10K 59/8791* (2023.02)

(58) Field of Classification Search
None
See application file for complete search history.

(56) References Cited

U.S. PATENT DOCUMENTS

| | | | | |
|---|---|---|---|---|
| 2008/0102284 | A1* | 5/2008 | Hong | C08G 59/68 |
| | | | | 524/588 |
| 2011/0104486 | A1* | 5/2011 | Ma | C09J 193/04 |
| | | | | 524/502 |
| 2012/0328873 | A1 | 12/2012 | Kishioka et al. | |
| 2015/0086767 | A1* | 3/2015 | Komatsuzaki | C09J 7/26 |
| | | | | 428/315.7 |
| 2015/0104601 | A1* | 4/2015 | Appeaning | C09J 7/385 |
| | | | | 428/41.4 |
| 2016/0177147 | A1* | 6/2016 | Han | C09J 7/22 |
| | | | | 428/220 |

(Continued)

FOREIGN PATENT DOCUMENTS

| | | |
|---|---|---|
| CN | 103509516 A | 1/2014 |
| CN | 106987212 A | 7/2017 |

(Continued)

*Primary Examiner* — Anthony J Frost
(74) *Attorney, Agent, or Firm* — Seed Intellectual Property Law Group LLP

(57) ABSTRACT

A display apparatus includes an adhesive layer disposed between a display panel and a cover member. The adhesive layer includes an adhesive member, and the adhesive member includes an acrylic copolymer including a first repeating unit having a glass transition temperature of −50° C. or less, a second repeat unit having a glass transition temperature of −45° C. to −10° C., and a third repeating unit having a glass transition temperature of 90° C. or more and the acrylic copolymer having a degree of crosslinking of 55% to 65%. The adhesive member further includes an elastomer and an inorganic nanofiller.

14 Claims, 7 Drawing Sheets

(56) References Cited

U.S. PATENT DOCUMENTS

| | | | |
|---|---|---|---|
| 2018/0148617 A1* | 5/2018 | Mogami | ............. C08F 293/005 |
| 2020/0317968 A1 | 10/2020 | Park et al. | |
| 2021/0122947 A1 | 4/2021 | Tabata et al. | |
| 2021/0246338 A1 | 8/2021 | Takarada et al. | |

FOREIGN PATENT DOCUMENTS

| | | | | |
|---|---|---|---|---|
| CN | 111902275 | A | | 11/2020 |
| CN | 111936589 | A | | 11/2020 |
| KR | 20100026161 | A | | 3/2010 |
| KR | 20130070964 | A | * | 6/2013 |
| KR | 10-2016-0053736 | A | | 5/2016 |
| KR | 10-2016-0053779 | A | | 5/2016 |
| KR | 20170135512 | A | | 12/2017 |
| KR | 20180052483 | A | | 5/2018 |
| KR | 20200119340 | A | | 10/2020 |
| WO | 2011111575 | A1 | | 9/2011 |

\* cited by examiner

|  | EXMAPLE 1 | EXMAPLE 2 | EXMAPLE 3 | EXMAPLE 4 | EXMAPLE 5 | EXMAPLE 6 |
|---|---|---|---|---|---|---|
| MONOMER A | 66.6 | 70.8 | 74 | 74 | 74 | 74 |
| MONOMER B | 16.7 | 12.5 | 13 | 13 | 13 | 13 |
| MONOMER C | 16.7 | 16.7 | 13 | 13 | 13 | 13 |
| ELASTOMER 1 | 8.3 | 8.3 | 9 | 13 | 13 | 13 |
| SILICA NANO PARTICLE | 8.3 | 8.3 | 9 | 9 | 13 | 13 |
| DEGREE OF CROSSLINKING | 60% | 60% | 60% | 60% | 60% | 55% |
| INITIAL ADHESIVE STRENGTH (25°C) | 1.5 | 1.5 | 1.7 | 1.5 | 1.5 | 1.8 |
| HIGH TEMPERATURE ADHESIVE STRENGTH (60°C) | 1.2 | 1.2 | 1.2 | 1.0 | 1.1 | 1.3 |
| DYNAMIC FOLDABILITY (-30°C) | OK | OK | OK | OK | OK | OK |
| DYNAMIC FOLDABILITY (25°C) | OK | OK | OK | OK | OK | OK |
| DYNAMIC FOLDABILITY (80°C) | OK | OK | OK | OK | OK | OK |
| STATIC FOLDABILITY (60°C, RH 90%) | OK | OK | OK | OK | OK | OK |

FIG. 5

| | EXPERIMENTAL EXAMPLE | | | | | | | | | | |
|---|---|---|---|---|---|---|---|---|---|---|---|
| | 1 | 2 | 3 | 4 | 5 | 6 | 7 | 8 | 9 | 10 | 11 |
| MONOMER A | 100 | 80 | 60 | 40 | 20 | 72.7 | 66.6 | 66.6 | 66.6 | 66.6 | 66.6 |
| MONOMER B | 0 | 20 | 40 | 60 | 80 | 18.2 | 16.7 | 16.7 | 16.7 | 16.7 | 16.7 |
| MONOMER C | – | – | – | – | – | 9.1 | 16.7 | 16.7 | 16.7 | 16.7 | 16.7 |
| ELASTOMER 1 | – | – | – | – | – | – | – | – | 8.3 | – | 16.7 |
| ELASTOMER 2 | – | – | – | – | – | – | – | 8.3 | – | 16.7 | – |
| DEGREE OF CROSSLINKING | 50% | 50% | 50% | 50% | 50% | 50% | 50% | 50% | 50% | 50% | 50% |
| INITIAL ADHESIVE STRENGTH (25°C) | 0.8 | 1.0 | 0.7 | 0.6 | 0.6 | 0.8 | 1.1 | 0.9 | 1.2 | 1.0 | 0.8 |
| HIGH TEMPERATURE ADHESIVE STRENGTH (60°C) | 0.4 | 0.8 | 0.4 | 0.4 | 0.4 | 0.4 | 0.9 | 0.7 | 1.0 | 0.8 | 0.6 |
| DYNAMIC FOLDABILITY (-30°C) | 10K | 10K | 10K | 10K | 10K | 10K | 20K | 10K | 20K | 10K | 10K |
| DYNAMIC FOLDABILITY (25°C) | 50K | 50K | 50K | 50K | 50K | 50K | 50K | 50K | 50K | 50K | 50K |
| DYNAMIC FOLDABILITY (80°C) | 20K | 50K | 20K | 20K | 20K | 20K | 55K | 30K | 70K | 30K | 30K |
| STATIC FOLDABILITY (60°C, RH 90%) | NG | NG | NG | NG | NG | NG | NG | NG | NG | NG | NG |

FIG. 6

|  | EXPERIMENTAL EXAMPLE ||||||
|  | 12 | 13 | 14 | 15 | 16 | 17 |
| --- | --- | --- | --- | --- | --- | --- |
| MONOMER A | 66.6 | 66.6 | 66.6 | 66.6 | 66.6 | 66.6 |
| MONOMER B | 16.7 | 16.7 | 16.7 | 16.7 | 16.7 | 16.7 |
| MONOMER C | 16.7 | 16.7 | 16.7 | 16.7 | 16.7 | 16.7 |
| ELASTOMER 1 | 8.3 | 8.3 | 8.3 | 8.3 | 8.3 | 8.3 |
| SILICA NANO PARTICLE | 4.17 | 8.3 | 16.7 | 8.3 | 8.3 | 8.3 |
| DEGREE OF CROSSLINKING | 50% | 50% | 50% | 30% | 40% | 70% |
| INITIAL ADHESIVE STRENGTH (25°C) | 0.8 | 1.2 | 1.1 | 0.8 | 1.0 | 1.1 |
| HIGH TEMPERATURE ADHESIVE STRENGTH (60°C) | 0.6 | 1.0 | 0.9 | 0.7 | 0.8 | 0.8 |
| DYNAMIC FOLDABILITY (-30°C) | 10K | 25K | 20K | 15K | 15K | 25K |
| DYNAMIC FOLDABILITY (25°C) | 50K | 50K | 50K | 50K | 50K | 50K |
| DYNAMIC FOLDABILITY (80°C) | 40K | 70K | 45K | 40K | 40K | 50K |
| STATIC FOLDABILITY (60°C, RH 90%) | NG | NG | NG | NG | NG | NG |

FIG. 7

ADHESIVE MEMBER AND DISPLAY APPARATUS INCLUDING THE SAME

CROSS-REFERENCE TO RELATED APPLICATIONS

This application claims the benefit of and priority to Korean Patent Application No. 10-2020-0190026 filed on Dec. 31, 2020 in the Republic of Korea, the entire contents of which are hereby expressly incorporated by reference into the present application.

BACKGROUND

Technical Field

The present disclosure relates to an adhesive member and a display apparatus including the same.

Description of the Related Art

As our society advances toward an information-oriented society, the field of display apparatuses for visually expressing an electrical information signal has rapidly advanced. Various display apparatuses having excellent performance in terms of thinness, lightness, and low power consumption, are being developed correspondingly. Examples of such display apparatuses include a liquid crystal display (LCD), a field emission display (FED), an organic light emitting display (OLED), and the like.

Recently, shapes and sizes of display apparatuses have been gradually diversified, and in particular, interests in flexible display apparatuses capable of maintaining display performance as they are even when the display apparatuses are bent or folded have continued to increase. Studies and development on a substrate, a support member, a cover window and an adhesive that are capable of satisfying folding reliability are actively being conducted, correspondingly.

BRIEF SUMMARY

An aspect of the present disclosure is to provide an adhesive member having a level of modulus capable of simultaneously satisfying folding characteristics and adhesion reliability over a wide temperature range ranging from low temperature to high temperature.

Another aspect of the present disclosure is to provide a display apparatus, capable of simultaneously satisfying folding characteristics and adhesive characteristics in a wide temperature range ranging from low temperature to high temperature by including the adhesive member as described above, while solving problems in a process such as an ooze-out during a bonding process.

Another aspect of the present disclosure is to implement various foldable display apparatuses without being limited to implementation methods such as an in-folding method, an out-folding method, and a multi-folding method, by using an adhesive member that satisfies both folding characteristics and adhesive characteristics over a wide temperature range.

Another aspect of the present disclosure is to implement various flexible display apparatuses by applying the adhesive member to a display apparatus having a thick cover member or a small curvature.

Objects of the present disclosure are not limited to the above-mentioned objects, and other objects, which are not mentioned above, can be clearly understood by those skilled in the art from the following descriptions.

An adhesive member according to some embodiments of the present disclosure comprises 100 parts by weight of an acrylic copolymer including a first repeating unit having a glass transition temperature of −50° C. or less, a second repeat unit having a glass transition temperature of −45° C. to −10° C., and a third repeating unit having a glass transition temperature of 90° C. or more, 5 to 20 parts by weight of an elastomer with respect to 100 parts by weight of the acrylic copolymer; and 5 to 20 parts by weight of an inorganic nanofiller with respect to 100 parts by weight of the acrylic copolymer, the acrylic copolymer has a degree of crosslinking of 55% to 65%.

A display apparatus according to some embodiments of the present disclosure includes a display panel; a cover member disposed on the display panel; and an adhesive layer disposed between the display panel and the cover member, wherein the adhesive layer includes an adhesive member, the adhesive member includes 100 parts by weight of an acrylic copolymer including a first repeating unit having a glass transition temperature of −50° C. or less, a second repeat unit having a glass transition temperature of −45° C. to −10° C., and a third repeating unit having a glass transition temperature of 90° C. or more, the adhesive member includes 100 parts by weight of the acrylic copolymer having a degree of crosslinking of 55% to 65%, 5 to 20 parts by weight of an elastomer with respect to 100 parts by weight of the acrylic copolymer, and 5 to 20 parts by weight of an inorganic nanofiller with respect to 100 parts by weight of the acrylic copolymer.

According to some embodiments of the present disclosure, the adhesive member has a constant modulus in a wide temperature range (e.g., −30° C. to 100° C.) ranging from low temperature to high temperature by decreasing a low temperature modulus compared to existing related art adhesive member and increasing a high temperature modulus. Accordingly, folding characteristics and bonding characteristics may be simultaneously satisfied in a wide temperature range ranging from low temperature to high temperature.

According to some embodiments of the present disclosure, the adhesive member allows a high modulus to be maintained in a temperature range ranging from room temperature to high temperature, thereby minimizing bonding defects such as the occurrence of an ooze-out and the like in a bonding process.

According to some embodiments of the present disclosure, the display apparatus may satisfy both folding reliability and bonding reliability over a wide temperature range ranging from low temperature to high temperature by the adhesive member.

According to some embodiments of the present disclosure, the display apparatus including the adhesive member may be easily implemented as various foldable display apparatuses in an in-folding, out-folding, or multi-folding manner. Further, according to some embodiments of the present disclosure, even when it is applied to a display apparatus having a thick cover member or a small curvature, both folding reliability and adhesion reliability may be satisfied in a wide temperature range.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the claims. Nothing in this section should be taken as a limitation on those claims. Further aspects and advantages are discussed below in conjunction with embodiments of the disclosure. It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

FIG. 5 is a table showing measurement results of compositions and physical properties of adhesive members according to Example 1 to Example 6.

FIG. 6 is a table showing measurement results of compositions and physical properties of adhesive members according to Experimental Example 1 to Experimental Example 11.

FIG. 7 is a table showing measurement results of compositions and physical properties of adhesive members according to Experimental Example 12 to Experimental Example 17.

DETAILED DESCRIPTION

Figure 1:
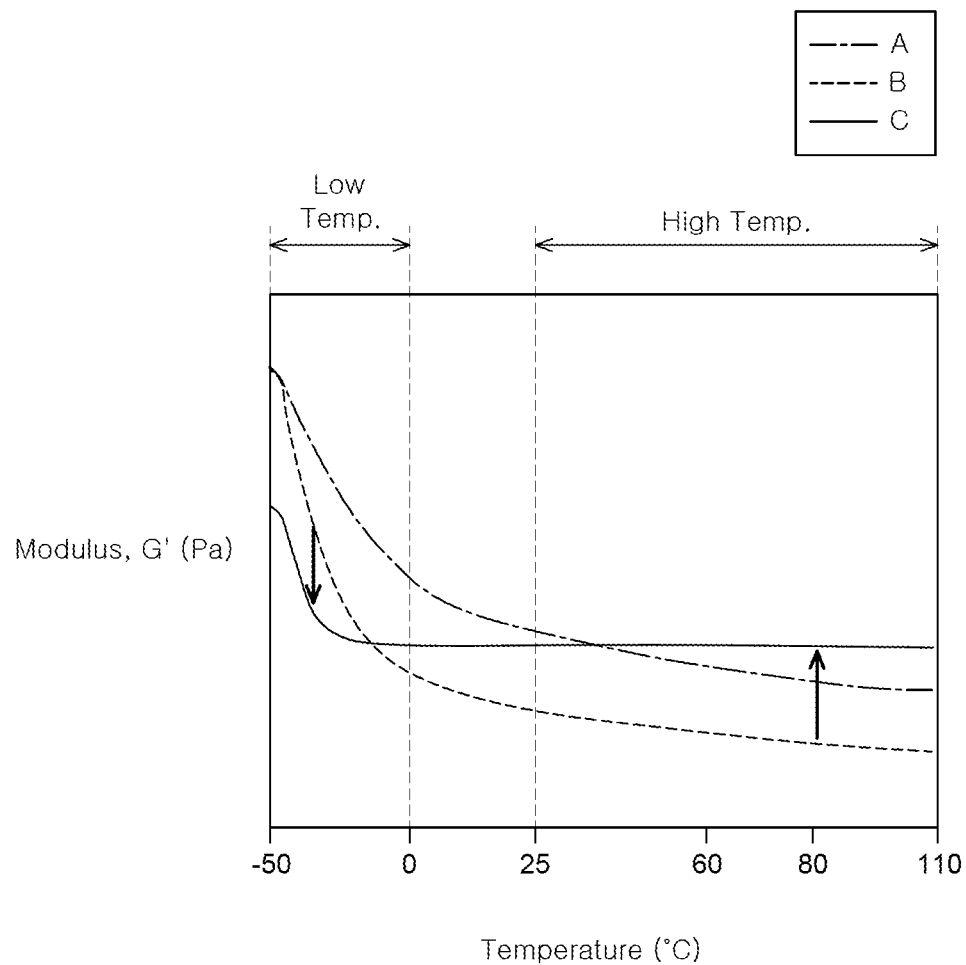
FIG. 1 is a graph for illustrating a change in modulus according to a change in temperature of respective types of adhesives.

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals generally denote like elements throughout. In the following description of the present disclosure, when the detailed description of the relevant known function or configuration is determined to unnecessarily obscure the important point of the present disclosure, the detailed description will be omitted.

In a case where "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case which is not continuous may be included unless a more limiting term, such as "just," "immediate(ly)," or "direct(ly)" is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms "first," "second," "A," "B," "(a)," "(b)," etc., may be used. These terms are intended to identify the corresponding elements from the other elements, and basis, order, or number of the corresponding elements should not be limited by these terms. The expression that an element or layer is "connected," "coupled," or "adhered" to another element or layer, the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more among the associated listed elements. For example, the meaning of "at least one or more of a first element, a second element, and a third element" denotes the combination of all elements proposed from two or more of the first element, the second element, and the third element as well as the first element, the second element, or the third element.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Unless otherwise specified therein, a glass transition temperature Tg may be measured using a dynamic shear rheometer. For example, it may be measured in a dynamic temperature sweep mode using a waters-TA's rotary rheometer (ARES-G2). For example, a shear storage modulus G', a shear loss modulus G" and a tangent delta G"/G' of a specimen are measured while increasing temperature at a rate of 5° C./min in a temperature range of −60° C. to 100° C. under conditions of 1% strain and 1 Hz frequency. Starting from the glass transition temperature, the shear storage modulus of a material decreases, and the tangent delta thereof increases. Accordingly, the glass transition temperature may be adjusted as a maximum peak of the tangent delta.

Unless otherwise specified, the storage modulus herein can be measured using a dynamic shear rheometer. For example, it may be measured in a dynamic temperature sweep mode using a waters-TA's rotary rheometer (ARES-G2). For example, it can be measured under conditions of a ramp rate of 5° C./minute in a temperature range of −60° C. to 100° C. under conditions of 1% shear strain and 1 Hz frequency.

Unless otherwise specified, shear creep strain herein can be measured using a dynamic shear rheometer. For example, it can be measured, in a method in which shear stress is applied while being gradually increased from 10 KPa to 50 KPa using a waters-TA's rotary rheometer (ARES-G2) and maintained for 10 minutes and then, the applied shear stress is removed.

Unless otherwise specified therein, a degree of crosslinking can be represented by a gel fraction. For example, the degree of crosslinking (gel fraction) can be represented by a weight fraction (wt %) of an insoluble component (gel) with respect to an initial weight of a specimen that is introduced after an adhesive member is added to methyl ethyl ketone and refluxed.

FIG. 1 is a graph showing a modulus as a function of temperature for different types of adhesives. FIG. 1 shows the change in the modulus with temperature for an existing general-purpose adhesive (adhesive A) used in a flat panel display apparatus, the change in the modulus with temperature for an existing adhesive (adhesive B) used a flexible display apparatus, and the change in the modulus with temperature for an adhesive (adhesive C) according to some embodiments of the present disclosure.

Referring to FIG. 1, the general-purpose adhesive (adhesive A) used in a flat panel display apparatus and the like has characteristics such that the modulus rapidly increases at a low temperature range of 0° C. or less but gradually decreases at a high temperature range above the room temperature. When the modulus increases rapidly, the flexibility of a material decreases rapidly, and stress relaxation characteristics decreases. When adhesive A described above is used to bond components in a flexible or foldable display apparatus, low temperature folding reliability cannot be satisfied due to the rapid increase in modulus of the adhesive A at the low temperature range.

Accordingly, adhesive B for a flexible display apparatus with a modulus in the low temperature range lower than that of adhesive A has been developed to satisfy folding reliability. Adhesive B for a flexible display apparatus is configured to have characteristics such that the modulus in the low temperature range is lower than that of adhesive A to satisfy low temperature folding characteristics. However, as shown in FIG. 1, the modulus is not lowered only in the low temperature range, but also in the high temperature range. As a result, the modulus of adhesive B decreases throughout a wide temperature range ranging from low temperature to high temperature. Accordingly, adhesive B for a flexible display apparatus has a significantly lower modulus than that of the general-purpose adhesive A in a temperature range ranging from low temperature to high temperature. When the modulus of the adhesive decreases, an adhesive strength decreases. Accordingly, there is a problem that the adhesive strength of adhesive B for a flexible display apparatus is deteriorated in a temperature range from room temperature to high temperature, and thus bubbles are generated at an adhesive interface or peeling between bonded components easily occurs, thereby failing to satisfy adhesion reliability. In addition, when the modulus of an adhesive is too low, it is difficult to perform a process control due to a push-out of the adhesive in a bonding process and there is also quality degradation caused by the occurrence of foreign material defects such as an ooze-out. For example, in instances where a display apparatus has a thick cover member, bubbles or peeling (or delamination) defects occur more frequently due to the decrease in adhesion. Further, in instances where a foldable display apparatus has a smaller curvature or is implemented in an in-folding method, since folding stress applied during the folding is greater than that of a display apparatus having a large curvature or being implemented in an out-folding method, cracks can be occurred in a cover member or peeling (or delamination) between bonded components can be easily occurred during a folding reliability evaluation.

Accordingly, the present disclosure provides an adhesive C that has improved low temperature folding characteristics by having a lower modulus than that of the existing adhesives at low temperatures, and has improved adhesion reliability by having a higher modulus that that of the existing adhesives at room temperature to high temperatures, as shown in FIG. 1.

Hereinafter, an adhesive member according to some embodiments of the present disclosure and a display apparatus including the same will be described in detail.

An adhesive member according to some embodiments of the present disclosure includes an acrylic copolymer, an elastomer, and an inorganic nanofiller. The adhesive member may be in the form of a film including an acrylic copolymer, an elastomer, and an inorganic nanofiller. For example, a thickness of the adhesive member in the form of a film may be 10 μm to 100 μm. The thickness of the film may be variously adjusted within the above range according to a type of display apparatus to which the adhesive member is applied. If necessary, it may have a thickness less than 10 μm or a thickness more than 100 For example, when the adhesive member is applied to a foldable display apparatus, it may have a thickness of 10 μm to 50 μm, for example, 15 μm to 30 μm, but embodiments of the present disclosure are not limited thereto.

The acrylic copolymer provides an adhesive characteristic as a main component of the adhesive member. The acrylic copolymer has an advantage of not degrading optical characteristics of a display apparatus when it is applied to the display apparatus because it has an excellent adhesive characteristic while being optically transparent. The acrylic copolymer includes a first repeating unit, a second repeating unit, and a third repeating unit. Each of the first repeating unit, the second repeating unit, and the third repeating unit are repeating units derived from different acrylic monomers. The acrylic copolymer may be a random copolymer.

First, the first repeating unit may be a repeating unit having a glass transition temperature of −50° C. or less as a main component of the acrylic copolymer. As described above, in general, the adhesive member exhibits a behavior in which the modulus rapidly increases at a low temperature of 0° C. or less. When the modulus rapidly increases as described above, flexibility of the adhesive member is degraded, and thus, there is a problem in that folding reliability on a level required for a flexible display apparatus is not satisfied at low temperature. Since the first repeating unit has a low glass transition temperature of −50° C. or less, it has excellent flexibility even at low temperature. Accordingly, the acrylic copolymer including the first repeating unit may inhibit a decrease in flexibility of the adhesive member at low temperature, for example, in a temperature range of −50° C. to 0° C. Accordingly, the adhesive member can maintain a lower modulus than a related art adhesive member even at low temperature. Thus, the adhesive member according to some embodiments of the present disclosure provides an effect of improving folding characteristics at low temperature. In some embodiments of the present disclosure, the glass transition temperature of the first repeating unit may be −80° C. to −50° C. or −75° C. to −65° C., and within this range, a low temperature folding characteristics may be further improved.

For example, the first repeating unit may be a repeating unit derived from an alkyl acrylate-based compound. For example, the first repeating unit may be a polymer of the alkyl acrylate-based compound. For example, the alkyl acrylate-based compound may be an alkyl acrylate including an alkyl group having 1 to 20 carbon atoms. For example, the alkyl acrylate-based compound may be one or more of an alkyl acrylate including a linear alkyl group having 1 to 12 carbon atoms, and an alkyl acrylate including a branched alkyl group having 3 to 12 carbon atoms. The first repeating unit formed of such an alkyl acrylate-based compound has a sufficiently low glass transition temperature, so that the folding characteristics at low temperature can be greatly improved. For example, the alkyl acrylate including a linear alkyl group having 1 to 12 carbon atoms may be one or more of n-hexyl acrylate, n-octyl acrylate, n-nonyl acrylate, n-butyl acrylate, and the like, but embodiments of the present disclosure are not limited thereto. For example, the alkyl acrylate including a branched alkyl group having 3 to 12 carbon atoms may be one or more of 2-ethylhexyl acrylate, iso-nonyl acrylate, iso-octyl acrylate, and the like, but embodiments of the present disclosure are not limited thereto. The first repeating unit may be a homopolymer from one of the alkyl acrylate-based compounds listed above or a copolymer polymerized from two or more of the alkyl acrylate-based compounds listed above.

The second repeating unit allows the acrylic copolymer to maintain high adhesion even at high temperature. The second repeating unit may be a repeating unit having a glass transition temperature of −45° C. to −10° C. As described above, the higher the glass transition temperature, the lower the flexibility of the acrylic copolymer. When the glass transition temperature of the second repeating unit is within the above range, the adhesion at high temperature can be secured without a significant decrease in low temperature folding characteristics of the acrylic copolymer. In some embodiments of the present disclosure, the glass transition temperature of the second repeating unit may be −40° C. to −20° C. and within this range, the adhesion reliability at high temperature may be improved while maintaining a higher folding characteristics at low temperature.

The second repeating unit may be a repeating unit derived from an acrylic monomer having a polar functional group. The polar functional group may interact with an interface to thereby improve adhesion. In addition, the polar functional group may serve as a crosslinking point. For example, the polar functional group may be chemically bonded with a crosslinking agent and facilitate introduction of a crosslinked structure. In addition, the polar functional group may inhibit a whitening phenomenon occurring in a high temperature and high humidity environment.

For example, the polar functional group may be a hydroxy group, an epoxy group, a urethane group, or the like, but embodiments of the present disclosure are not limited thereto. These polar functional groups improve an interfacial adhesive strength and have excellent reactivity with a crosslinking agent, thereby facilitating introduction of a crosslinked structure.

For example, the second repeating unit may be a repeating unit derived from a hydroxyalkyl (meth)acrylate-based compound. For example, the second repeating unit may be a polymer of a hydroxyalkyl (meth)acrylate-based compound. As described above, the hydroxy group may improve an interfacial adhesive strength and act as a crosslinking point, and may inhibit a whitening phenomenon in a high temperature/high humidity environment. For example, the hydroxyalkyl (meth)acrylate-based compound may be one or more among 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate, but embodiments of the present disclosure not limited thereto. The second repeating unit may be a homopolymer from one of the above-described compounds or a copolymer polymerized from two or more of the above-described compounds. The hydroxyalkyl (meth)acrylate-based compounds described above may improve an adhesive strength without degrading folding characteristics of the acrylic copolymer and, for example, may allow a high adhesive strength to be maintained even at high temperature.

The third repeating unit may improve an adhesive strength of the adhesive member. The first and second repeating units have relatively low glass transition temperatures and lower a low temperature modulus of the adhesive member. As described above, when the modulus is lowered, the flexibility of the acrylic copolymer increases, thereby improving folding characteristics. However, not only at low temperature but also in the entire temperature range from room temperature to high temperature, the modulus may be lowered, so that adhesion may be lowered. The third repeating unit prevents a decrease in modulus at room temperature to high temperature, which is accompanied by the introduction of the first and second repeating units, and allows a high modulus to be maintained within a temperature range of room temperature or more.

The third repeating unit may be a repeating unit having a glass transition temperature of 90° C. or more. The third repeating unit has a very high glass transition temperature of 90° C. or more, so that it is possible to inhibit a decrease in modulus of the adhesive member within a temperature range of room temperature to high temperature, for example, 25° C. to 100° C. Accordingly, a folding characteristic at low temperature of the adhesive member may be improved, and at the same time, an adhesive characteristic at high temperature thereof may be improved. In some embodiments of the present disclosure, the glass transition temperature of the third repeating unit may be 90° C. to 120° C. and an adhesive characteristic improvement effect is more excellent within this range.

For example, the third repeating unit may be a repeating unit derived from one or more compounds among an alkyl methacrylate-based compound, (meth)acrylic acid, and isobornyl acrylate. For example, the third repeating unit may be a polymer formed by polymerizing one or more compounds among an alkyl methacrylate-based compound, (meth)acrylic acid, and isobornyl acrylate. For example, the third repeating unit may be a homopolymer from one of alkyl methacrylate, (meth)acrylic acid, and isobornyl acrylate. As another example, the third repeating unit may be a copolymer formed by polymerizing two or more of alkyl methacrylate, (meth)acrylic acid, and isobornyl acrylate.

For example, the alkyl methacrylate-based compound may be an alkyl methacrylate including an alkyl group having 1 to 20 carbon atoms. For example, the alkyl methacrylate-based compound may be one or more of an alkyl methacrylate including a linear alkyl group having 1 to 12 carbon atoms, and an alkyl methacrylate including a branched alkyl group having 3 to 12 carbon atoms. For example, the alkyl methacrylate including a linear alkyl group having 1 to 18 carbon atoms may be one or more of methyl methacrylate, ethyl methacrylate, n-propyl methacrylate, octyl methacrylate, and decyl methacrylate, but embodiments of the present disclosure are not limited thereto. For example, the alkyl methacrylate including a branched alkyl group having 3 to 12 carbon atoms may be one or more of t-butyl methacrylate, iso-butyl methacrylate, and iso-propyl methacrylate, but embodiments of the present disclosure are not limited thereto.

For example, the third repeating unit may be a homopolymer of isobornyl acrylate, methyl methacrylate, acrylic acid or methacrylic acid, or a copolymer formed by polymerizing two or more compounds among isobornyl acrylate, methyl methacrylate, acrylic acid, and methacrylic acid.

The folding characteristic at low temperature and the adhesion improvement effect at high temperature of the acrylic copolymer may vary depending on the contents of the first repeating unit, the second repeating unit, and the third repeating unit. For example, the acrylic copolymer may include 60% to 90% by weight of the first repeating unit, 5% to 25% by weight of the second repeating unit, and 5% to 25% by weight of the third repeating unit. In this case, the weight percent (% by weight), which is a content unit of each repeating unit, is based on total 100% by weight of monomers introduced in polymerization reaction for preparing the acrylic copolymer.

As described above, the first repeating unit occupies the largest content ratio as a main component constituting the acrylic copolymer. When the content ratio of the first repeating unit is less than 60% by weight, the effect of improving the low temperature folding characteristic is insufficient, so when the adhesive member according to some embodiments of the present disclosure is applied to a flexible display apparatus, folding reliability may not be satisfied at low temperature. When the content ratio of the first repeating unit exceeds 90% by weight, the ratio of the first repeating unit having a low glass transition temperature is too high, so that an adhesive characteristic may deteriorate at room temperature to high temperature.

As described above, the second repeating unit is formed from a hydroxyalkyl (meth)acrylate-based compound having a polar functional group capable of improving an adhesive characteristic. When a content ratio of the second repeating unit is less than 5% by weight, the adhesion improvement effect may be insufficient. When the content ratio of the second repeating unit exceeds 20% by weight, the glass transition temperature of the acrylic copolymer increases and the modulus of the adhesive member increases, so that a stress relaxation effect may decrease. Accordingly, the low temperature folding characteristic may be degraded, and a problem that adhesion is degraded at low temperature may occur.

As described above, the third repeating unit is introduced to further improve adhesion of the adhesive member. Accordingly, when a content ratio of the third repeating unit is less than 5% by weight, the adhesion improvement effect may be insufficient. In addition, the third repeating unit has a relatively high glass transition temperature compared to the first and second repeating units. The first and second repeating units having relatively low glass transition temperatures have soft characteristics, and the third repeating unit having a relatively high glass transition temperature exhibits relatively hard physical characteristics opposite to those of the first and second repeating units. Accordingly, when the content ratio of the third repeating unit exceeds 20% by weight, compatibility with the first and second repeating units decreases, and a fine phase separation between the first and second repeating units and the third repeating unit may occur. When such a phase separation occurs, a haze value of the adhesive member increases, so that transparency thereof may decrease.

In some embodiments of the present disclosure, the acrylic copolymer may include 65% to 74% by weight of the first repeating unit, 10% to 20% by weight of the second repeating unit, and 10% to 20% by weight of the third repeating unit. Within this range, a folding characteristic at low temperature and an adhesion at high temperature are more excellent. However, embodiments of the present disclosure are not limited thereto and may vary depending on types of monomers used, a degree of hardening of the adhesive member, and the like.

The acrylic copolymer may be manufactured by preparing and polymerizing a reactant including an initiator and acrylic monomers for forming each of the first repeating unit, the second repeating unit, and the third repeating unit. For example, the acrylic copolymer may be manufactured, in a method of preparing a monomer mixture by mixing 2-ethylhexyl acrylate, 4-hydroxybutyl acrylate, and isobornyl acrylate in a solvent, adding an initiator into the monomer mixture, and performing photopolymerization or thermal polymerization thereon. When manufacturing an acrylic copolymer by a photopolymerization method, a known photo-initiator may be added and then, UV may be irradiated to thereby manufacture an acrylic copolymer. In addition, when manufacturing an acrylic copolymer by a thermal polymerization method, a known thermal initiator may be added and heated to thereby manufacture an acrylic copolymer.

The acrylic copolymer includes a crosslinked structure. When the acrylic copolymer is crosslinked, the adhesive member exhibits excellent flexibility while maintaining a high adhesive strength of the adhesive member. Accordingly, it is possible to provide a high adhesive retention force while maintaining a high folding characteristic of the adhesive member. For example, when the degree of crosslinking of an acrylic copolymer increases, a gel fraction increases, thereby increasing cohesion of the polymer and inhibiting fluidity thereof. Accordingly, it is easy to control the adhesive member during a bonding process or attachment process, so that workability is improved and the occurrence of a foreign material such as an ooze-out is reduced. For example, the ooze-out may be a defect that occurs when the adhesive member escapes during a bonding process and/or a folding operation. In addition, when the degree of crosslinking of the acrylic copolymer increases, the modulus of the acrylic copolymer increases at room temperature to high temperature, thereby improving an adhesion at high temperature and improving a stress relaxation characteristic. Accordingly, when the adhesive member is applied to a cover member having a high rigidity or a thick thickness or a display apparatus in which it is difficult to alleviate folding stress, such as a foldable display apparatus having a large curvature or a foldable display apparatus implemented in an in-folding manner, interfacial peeling or interfacial delamination is minimized, and folding reliability and adhesion reliability can be satisfied at the same time.

The degree of crosslinking of the acrylic copolymer may be represented by a gel fraction. For example, the degree of crosslinking (gel fraction) of the acrylic copolymer may be 55% to 65%. Within this range, while maintaining a high folding characteristic of the adhesive member, an adhesive characteristic thereof may be further improved at a temperature of room temperature or more. When the degree of crosslinking is less than 55%, an adhesive characteristic improvement effect may be insufficient at room temperature to high temperature, and fluidity at high temperature may be large, making it difficult to control a process of the adhesive member. In addition, when the degree of crosslinking exceeds 65%, a stress relaxation rate is lowered and the fluidity is poor. Thus, when the adhesive member is applied to a display apparatus, bubbles may occur at a bonding interface or peeling (or delamination) may occur at an edge portion.

It may be more preferable that the acrylic copolymer has a large average molecular weight between crosslinking points and a degree of crosslinking within the above range in terms of excellent folding characteristics and further enhanced adhesion. Here, the crosslinking point means a position of a chain where a crosslinking bond is formed, and the average molecular weight between crosslinking points means an average molecular weight of chains between the crosslinking points. When the average molecular weight between the crosslinking points of the acrylic copolymer is large and the degree of crosslinking is 55% to 65%, which is high, flexibility, a stress relaxation characteristic, and an adhesive characteristic are more excellent, and fluidity at high temperature is controlled, thereby allowing for an easy process control during a bonding process and minimizing the occurrence of ooze-out defects.

For example, the crosslinked structure may be introduced by adding a polyfunctional compound to monomers for forming each of the first repeating unit, the second repeating unit, and the third repeating unit and performing copolymerization in a process of polymerizing the acrylic copolymer. For example, the polyfunctional compound may be polyfunctional (meth)acrylate. For example, the polyfunctional (meth)acrylate may include bifunctional (meth)acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate, di(meth)acrylate, di(meth)acryloxyethyl isocyanurate, dimethylol dicyclopentane di(meth)acrylate or the like; trifunctional (meth)acrylate such as trimethylolpropane tri(meth) acrylate, dipentaerythritol tri(meth)acrylate, pentaerythritol tri(meth)acrylate, trifunctional urethane (meth)acrylate or the like; tetrafunctional (meth)acrylate such as diglycerin tetra(meth)acrylate, pentaerythritol tetra(meth)acrylate or the like; pentafunctional (meth)acrylate such as dipentaerythritol penta(meth)acrylate or the like; and hexafunctional (meth)acrylate such as dipentaerythritol hexa(meth) acrylate, caprolactone-modified dipentaerythritol hexa (meth)acrylate or the like, but embodiments of the present disclosure are not limited thereto.

In some embodiments of the present disclosure, the crosslinked structure may be introduced by polymerizing the monomers to prepare an acrylic copolymer, and then, adding a crosslinking agent thereto and performing a crosslinking reaction. For example, the crosslinking agent may be one or more of an epoxy-based crosslinking agent, an oxazoline-based crosslinking agent, an aziridine-based crosslinking agent, a carbodiimide-based crosslinking agent, and a metal chelate-based crosslinking agent, but embodiments of the present disclosure are not limited thereto. As described above, the second repeating unit is formed from an acrylic compound having a polar functional group, and the polar functional group can be chemically bonded to the crosslinking agent. Accordingly, the acrylic copolymer may have a crosslinked structure by chemical bonding between the polar functional group of the second repeating unit and the crosslinking agent. For example, the second repeating unit may be formed of a hydroxyalkyl (meth)acrylate-based compound, and in this case, an epoxy-based crosslinking agent having excellent reactivity with a hydroxy group may be used therefor, but embodiments of the present disclosure are not limited thereto.

The elastomer allows a high modulus to be kept constant within a temperature range of room temperature to high temperature so that adhesion reliability may be satisfied. For example, the elastomer may be a high molecular weight elastomer having a weight average molecular weight of 1,000,000 g/mol or more. A polymer material having a high molecular weight is composed of long chains, and these long chains form entanglements. In addition, as a temperature of the polymer material increases, the movement of polymer chains increases, with a decrease in modulus. However, when the entanglements described above are formed, the polymer chains are entangled with each other even when heat is applied, so that there has a rubbery plateau area where the modulus does not decrease and remains constant. When the adhesive member includes an elastomer having a rubbery plateau area within a wide temperature range ranging from room temperature to high temperature, the modulus does not decrease and remains constant within this temperature range, so that it can provide high adhesion and a whitening phenomenon or peeling (or delamination) between bonded components can be minimized.

For example, the elastomer may be an isobutylene-based (co)polymer. The isobutylene-based (co)polymer has excellent compatibility with an acrylate-based compound that forms an acrylic copolymer, and has high solubility not to thereby decrease polymerization process efficiency. In addition, it has an advantage of excellent optical characteristics due to high transmittance. For example, the isobutylene-based (co)polymer may be an isobutylene-isoprene copolymer, but embodiments of the present disclosure are not limited thereto.

For example, the elastomer may be included in an amount of 5 to 20 parts by weight or 8 to 15 parts by weight based on 100 parts by weight of the acrylic copolymer. Within this range, an effect of improving adhesion reliability of the adhesive member is more excellent. When the content of the elastomer is less than 5 parts by weight, the effect of improving adhesion reliability is insufficient. In addition, when the content of the elastomer exceeds 20 parts by weight, phase separation occurs between the elastomer having a relatively high molecular weight and the acrylic copolymer, thereby degrading the optical characteristics of the adhesive member and causing uneven physical characteristics. However, embodiments of the present disclosure are not limited thereto, and may be adjusted according to a weight average molecular weight and the like of the elastomer.

The inorganic nanofiller allows the modulus to be maintained high without decreasing thereof at a temperature of room temperature or more. As described above, as the degree of crosslinking of the acrylic copolymer increases, the modulus of the adhesive member increases, so that the modulus can be maintained high at a temperature of room temperature or more. However, if the degree of crosslinking is high, not only in a temperature range of room temperature or more but also in the entire temperature range, for example, even at low temperature, the modulus increases. Accordingly, when the degree of crosslinking exceeds a certain level, for example, 65%, the modulus is high at low temperature, so that a low temperature folding characteristic may be degraded. The inorganic nanofiller can improve the modulus at a temperature of room temperature or more while keeping the low temperature modulus low. For example, the inorganic nanofiller may be silica nanoparticles having an average particle diameter of 10 nm to 50 nm. Silica particles having an average particle diameter within the above range have excellent optical characteristics and thus, improve adhesion reliability without increasing a haze of the adhesive member or reducing the transmittance thereof. When the average particle diameter of the inorganic nanofiller is less than 10 nm, aggregation between particles is easy, so the physical characteristics of the adhesive member are not uniform, and exterior quality thereof may be degraded. When the average particle diameter of the inorganic nanofiller exceeds 50 nm, a particle size increases by agglomeration due to interaction between the particles, resulting in a decrease in light transmittance and an increase in haze, so that optical characteristics may not be satisfied when the adhesive member is applied to a display apparatus.

For example, the inorganic nanofiller may be included in an amount of 5 to 20 parts by weight or 8 to 15 parts by weight based on 100 parts by weight of the acrylic copolymer. The adhesive characteristic may be greatly improved while maintaining high optical characteristics of the adhesive member within this range. When the content of the inorganic nanofiller is less than 5 parts by weight, the content is too small and the modulus may not be greatly improved at a temperature of room temperature or more, so that the effect of improving physical characteristics may be insufficient. When the content of the inorganic nanofiller exceeds 20 parts by weight, the content of the inorganic nanofiller is excessive, so if the adhesive member is formed to have a smaller thickness, the inorganic nanofiller may protrude to a surface of the adhesive member, thereby degrading surface characteristics. In addition, the modulus may increase too much and folding characteristics may be degraded.

The adhesive member may include various additives. For example, the additive may be one or more of a coupling agent, a curing accelerator (or accelerator of hardening or hardener), a stabilizer, an antifoaming agent, an ultraviolet absorber, an antistatic agent, and a lubricant, but embodiments of the present disclosure are not limited thereto.

For example, the adhesive member may further include a coupling agent as an additive. The coupling agent may be one or more of silane-based coupling agents such as amino silane and epoxy silane, but embodiments of the present disclosure are not limited thereto. The silane coupling agent can absorb moisture in a high temperature and high humidity environment, thereby inhibiting generation of bubbles on the surface of the adhesive member and improving adhesion to a substrate having hydrophilic characteristics. For example, a silane coupling agent may be added in a concentration of 0.01% to 2% by weight based on a total weight of the adhesive member, but embodiments of the present disclosure are not limited thereto.

For example, the adhesive member according to some embodiments of the present disclosure may be manufactured as follows. First, an acrylic monomer mixture for forming each of the first repeating unit, the second repeating unit, and the third repeating unit, an initiator, and a polyfunctional acrylate compound are added and partially polymerized to thereby prepare a pre-polymer. Next, after diluting the pre-polymer in a solvent (e.g., methyl ethyl ketone), an isobutylene-isoprene copolymer and silica nanoparticles are added thereto to prepare an adhesive composition. After the adhesive composition is applied onto a substrate and heat curing may be performed thereon to thereby manufacture an adhesive member in the form of a film, but embodiments of the present disclosure are not limited thereto.

Figure 2:
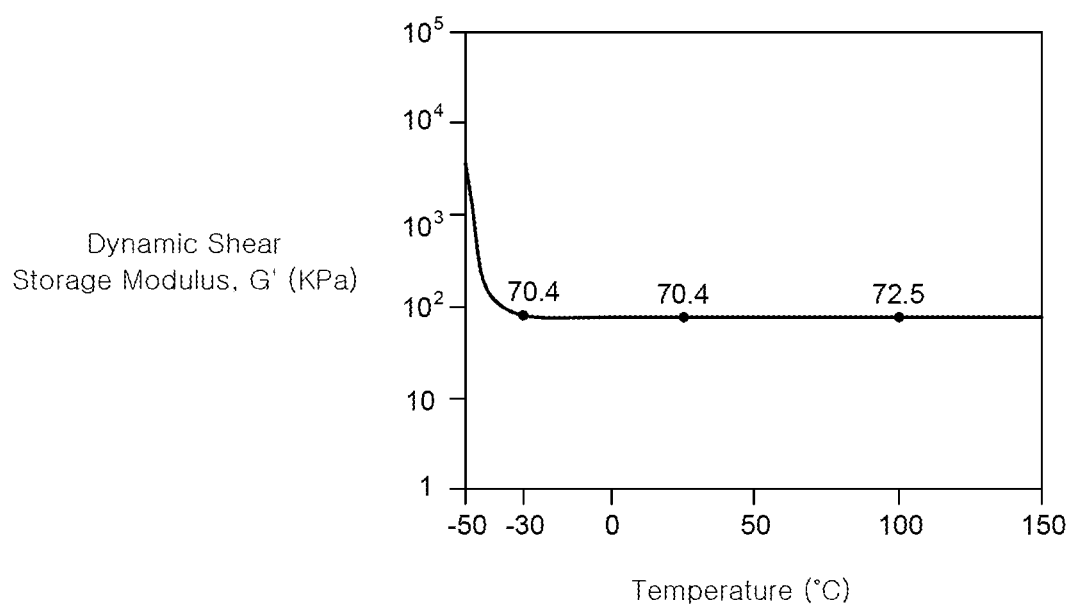
FIG. 2 is a graph illustrating a dynamic shear storage modulus according to a change in temperature of an adhesive member according to some embodiments of the present disclosure.
Figure 3:
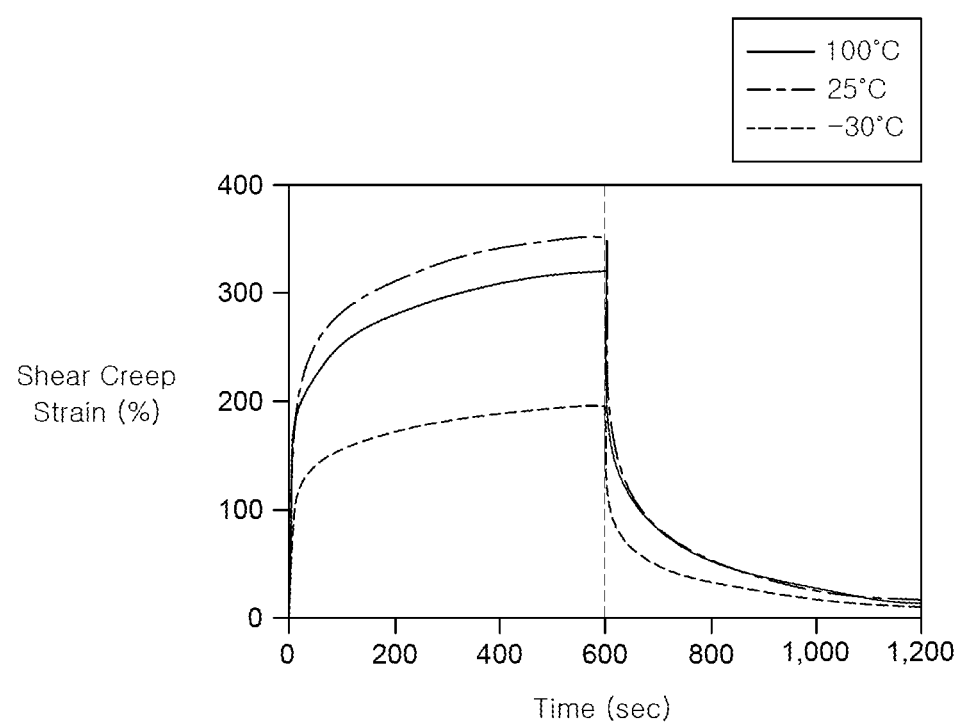
FIG. 3 is a graph illustrating creep strain over time of the adhesive member according to some embodiments of the present disclosure, at each of temperatures of −30° C., 25° C., and 100° C.

The physical characteristics of the adhesive member of the present disclosure will be described with reference to FIGS. 2 and 3. FIG. 2 is a graph illustrating a dynamic shear storage modulus according to a change in temperature of an adhesive member according to some embodiments of the present disclosure. FIG. 3 is a graph illustrating creep strain over time of the adhesive member according to some embodiments of the present disclosure, at each of temperatures of −30° C., 25° C., and 100° C.

With reference to FIG. 2, the adhesive member of the present disclosure may have a storage modulus of $5 \times 10^4$ Pa to $5 \times 10^5$ Pa in a temperature range of −30° C. to 100° C. In addition, the adhesive member may have an average slope of −0.5 to 0 in the temperature range of −30° C. to 100° C. when temperature is an x-axis (° C.) and a dynamic shear storage modulus is a y-axis (KPa) in distribution of the storage modulus according to temperature. For example, the average slope may be −0.1 to 0. In this case, when the adhesive member is applied to a display apparatus, for example, a flexible display apparatus, there is an advantage of having excellent adhesion while satisfying folding reliability. As described with reference to FIG. 1, a related art adhesive member for a flexible display apparatus had a problem that a storage modulus rapidly increases at −30° C. and thus, a folding characteristic at low temperature is degraded. In addition, there is a problem that the modulus gradually decreases as temperature goes from room temperature to high temperature, leading to a decrease in adhesion. As shown in FIG. 2, it could be confirmed that the modulus of the adhesive member according to some embodiments of the present disclosure is significantly reduced at low temperature compared to the related art adhesive member, however the modulus is not lowered and maintained high within a temperature range from room temperature to high temperature. For example, the adhesive member according to some embodiments of the present disclosure maintains a constant modulus at a level of $5 \times 10^4$ Pa to $5 \times 10^5$ Pa within a wide temperature range of −30° C.

to 100° C. In this manner, on the graph of temperature-storage modulus, an average slope is from −0.5 to 0, which is low within a wide temperature range of −30° C. to 100° C., so that a folding characteristic at low temperature and an adhesion reliability at high temperature can be satisfied at the same time. For example, an average slope in a range in which the temperature is −30° C. to 0° C. may be −0.05 to 0, and an average slope in a range in which the temperature is 60° C. to 100° C. may be −0.05 to 0. In this case, a folding characteristic at low temperature is more excellent, and adhesion is maintained high at room temperature to high temperature, thereby providing an effect of excellent adhesion reliability.

With reference to FIG. 2, the adhesive member according to some embodiments of the present disclosure may have a dynamic shear storage modulus of 70.4 KPa, 70.4 KPa, and 72.5 KPa at −30° C., 25° C., and 100° C., respectively. Based on this, an average slope in a range of −30° C. to 100° C. is −0.02, an average slope at −30° C. to 25° C. is 0, and an average slope at 25° C. to 100° C. is −0.02. As described above, the adhesive member according to some embodiments of the present disclosure has a slope of almost 0 within a temperature range of −30° C. to 100° C., and has a slope of 0 in a low temperature range. As such, there is little variation in modulus within a considerably wide temperature range, so that folding characteristics and adhesive characteristics may be satisfied at the same time.

FIG. 3 is a graph showing results of measuring a dynamic shear storage modulus by applying shear stress of from 0.1% to 500% to a specimen at each of temperatures of −30° C., 25° C., and 100° C. in order to find out a linear viscoelastic region by temperature of the adhesive member. The dynamic shear storage modulus according to strain can be measured using a dynamic shear rheometer. For example, it can be measured through a dynamic strain amplitude test using a Waters-TA's rotary rheometer (ARES-G2). For example, the dynamic shear storage modulus was measured by applying shear stress of from 0.1% to 500% to the specimen under conditions of a frequency of 1 Hz and a ramp rate of 5° C./minute.

Shear creep strain shown in FIG. 3 was measured by a method of applying shear stress to the adhesive member while gradually increasing the shear stress from 10 KPa to 50 KPa and maintaining it for 10 minutes, and then, removing the shear stress. With reference to FIG. 3, it could be confirmed that the adhesive member according to some embodiments of the present disclosure has a recovery rate of 90% or more, which is high, at each of temperatures of −30° C., 25° C., and 100° C. Here, the recovery rate (%) is defined by Equation 1 below.

Recovery rate=$(S1-S2)/S1 \times 100\%$    Equation 1

In Equation 1, S1 is a maximum creep strain (%) when a maximum strain is applied by applying shear stress to the adhesive member while gradually increasing the shear stress from 10 KPa to 50 KPa under a temperature condition to be measured and maintaining the maximum shear stress for 10 minutes, and S2 is a residual strain (or permanent set) (%) that remains unrecovered when the applied shear stress is removed, after the generation of the maximum creep strain.

As a result of evaluation of the shear creep strain, it was confirmed that the maximum creep strains at −30° C., 25° C., and 100° C. were 200%, 350%, and 325%, respectively. In addition, it was confirmed that the residual strains at −30° C., 25° C., and 100° C. were 10%, 18%, and 16%, respectively. In addition, it was confirmed that the recovery rates at −30° C., 25° C., and 100° C. calculated based on the maximum creep strain and residual strain values were 95%, 92%, and 90%, respectively. From this, it could be confirmed that the adhesive member according to some embodiments of the present disclosure has excellent folding characteristics within a wide temperature range ranging from −30° C. to 100° C. and can be restored to its original shape while allowing for minimized deformation or damage. Therefore, when the adhesive member according to some embodiments of the present disclosure is applied to a flexible display apparatus, the display apparatus may be easily folded without cracking or peeling (or delamination), and when the folded display apparatus is unfolded again, it could be confirmed that the folded display apparatus is restored to its original shape without deformation or damage such as being pressed.

The adhesive member according to embodiments of the present disclosure has excellent folding characteristics and excellent adhesive characteristics within a wide temperature range ranging from low temperature to high temperature, and can be applied to various display apparatuses.

Figure 4:
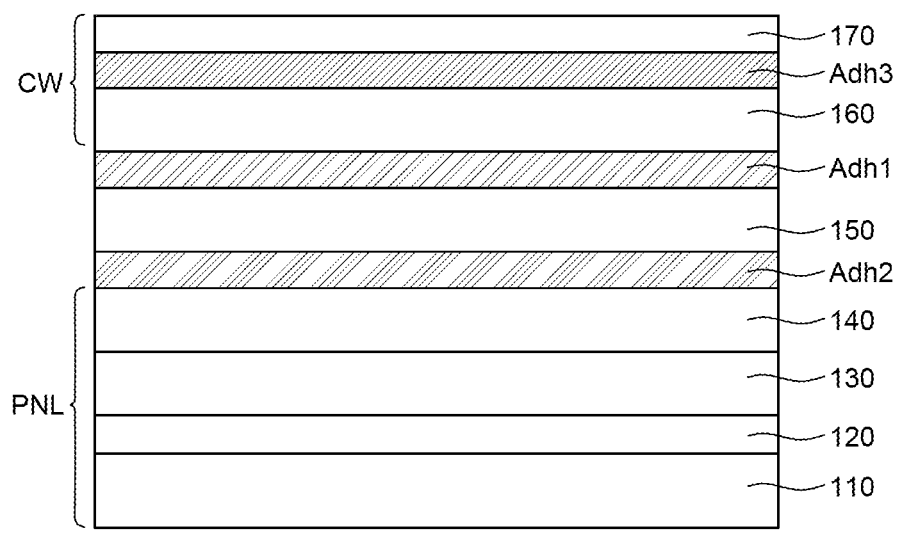
FIG. 4 is a cross-sectional view of a display apparatus according to some embodiments of the present disclosure.

Hereinafter, a display apparatus including the adhesive member according to embodiments of the present disclosure will be described in detail with reference to FIG. 4. FIG. 4 is a cross-sectional view of a display apparatus according to some embodiments of the present disclosure. With reference to FIG. 4, a display apparatus 100 according to some embodiments of the present disclosure includes a display panel PNL, a first adhesive layer Adh1, a polarizing plate 150, a second adhesive layer Adh2, and a cover member CW.

The display panel PNL includes a display area and a non-display area. The display area is an area where a plurality of pixels is disposed to display an image. The pixels including a light emitting area for displaying an image and a driving circuit for driving the pixels may be disposed in the display area. The non-display area is disposed to surround the display area. The non-display area is an area where an image is not displayed, and various lines for driving the pixels and the driving circuit disposed in the display area, driving ICs, a printed circuit board, and the like are disposed in the non-display area. Meanwhile, in the non-display area, as described above, driving ICs, a printed circuit board or the like may be disposed, and a predetermined area is required to place the driving ICs, the printed circuit board, and the like.

For example, the display panel PNL may be a liquid crystal display panel including a liquid crystal layer and displaying an image by adjusting light transmittance of liquid crystals. In some embodiments of the present disclosure, the display panel PNL may be an organic light emitting display panel including an organic light emitting layer and displaying an image using light emitted therefrom. Unlike the liquid crystal display panel, the organic light emitting display panel is a self-emitting element that does not require a separate light source, and it is thin and has excellent flexibility. Hereinafter, for convenience of description, the display apparatus according to embodiments of the present disclosure is described assuming that the display panel PNL is an organic light emitting display panel, but embodiments of the present disclosure are not limited thereto.

For example, the display panel PNL may include a plate assembly 110, a back plate 120, a thin film transistor substrate 130, and an organic light emitting element 140.

First, the thin film transistor substrate 130 includes a substrate that supports various elements of the display panel PNL and a plurality of thin film transistors that are disposed on the substrate.

The substrate is a substrate configured to support various elements of the display panel PNL. The substrate may be a plastic substrate having flexibility. For example, the plastic substrate may be one or more of polyimide, polyethersulfone, polyethylene terephthalate, and polycarbonate, but embodiments of the present disclosure are not limited thereto. Since the plastic substrate has a relatively weak barrier characteristic to moisture or oxygen, it may have a structure in which a plastic film and an inorganic film are stacked to compensate for this. For example, the flexible substrate may have a multilayer structure in which a first polyimide film, an inorganic film, and a second polyimide film are sequentially stacked, but embodiments of the present disclosure are not limited thereto.

The thin film transistors are disposed on the substrate to correspond to each of a plurality of sub-pixels. The thin film transistor drives the organic light emitting element disposed in each of the plurality of sub-pixel areas. For example, the thin film transistor may include a gate electrode, an active layer, a source electrode, and a drain electrode. For example, the active layer is disposed on the substrate, and a gate insulating layer for insulating the gate electrode is disposed on the active layer. In addition, an interlayer insulating layer for insulating the gate electrode, and the source electrode and the drain electrode may be formed, and the source electrode and the drain electrode that are respectively in contact with the active layer may be disposed on the interlayer insulating layer. However, embodiments of the present disclosure are not limited thereto, and a configuration and arrangement of the thin film transistor may be changed as necessary.

A planarization layer may be disposed on the thin film transistor to planarize an upper surface thereof, and the organic light emitting element 140 may be disposed on the planarization layer. The organic light emitting element 140 may include an anode, an organic light emitting layer, and a cathode. For example, an anode is disposed on the planarization layer, and the anode is electrically connected to the source electrode or the drain electrode. The organic light emitting layer is disposed between the anode and the cathode, and holes injected from the anode and electrons injected from the cathode are combined in the organic light emitting layer to thereby emit light. The organic light emitting layer is formed to emit light of a color corresponding to each of the plurality of sub-pixels. For example, the organic light emitting layer of the organic light emitting element 140 disposed in a red sub-pixel area is formed of an organic light emitting material that emits red light. A protective layer may be disposed on the organic light emitting element to flatten or planarize an upper surface of the organic light emitting element 140 and prevent deterioration of the organic light emitting element due to moisture or oxygen penetrating from the outside. The protective layer may be a single layer or may be formed in a multilayer structure. For example, the protective layer may be composed of at least one organic protective layer and at least two inorganic protective layers, and may have a multilayer structure in which an organic protective layer is disposed between two inorganic protective layers, but embodiments of the present disclosure are not limited thereto.

When the substrate is formed of a flexible plastic material, sagging of the substrate may occur due to a small thickness and low rigidity thereof as compared to a glass substrate, or in the case of folding or bending the display apparatus 100, it may be difficult to maintain a constant shape thereof and it may be vulnerable to external impacts.

Accordingly, various types of support member may be disposed at a rear surface of the thin film transistor substrate 130. For example, the back plate 120 and the plate assembly 110 may be disposed at a rear surface of the substrate.

The back plate 120 may be formed of, for example, a metallic material such as stainless steel (SUS) or Invar, or may be formed of a plastic material such as polymethyl methacrylate (PMMA), polycarbonate (PC), polyvinyl alcohol (PVA), acrylonitrile-butadiene-styrene (ABS), polyethylene terephthalate (PET), silicone or polyurethane (PU), or the like.

The plate assembly 110 is disposed at a rear surface of the back plate 120. The back plate 120 may be formed of a material and structure that is advantageous for alleviating folding stress applied when bending or folding the display apparatus 100. While a material capable of effectively alleviating folding stress has excellent flexibility, it may not sufficiently absorb impacts from a rear surface of the display apparatus 100. Accordingly, the plate assembly 110 may be disposed at the rear surface of the back plate 120 to reinforce impact resistance. For example, the plate assembly 110 may include a plate top and a plate bottom. The plate top and the plate bottom may be integrally formed, and if necessary, the plate top or the plate bottom may be omitted.

The plate bottom may include an opening pattern in a region where stress is concentrated. For example, when implementing a foldable display apparatus, the plate bottom may include an opening pattern in a portion corresponding to a folding area. Accordingly, it is possible to effectively alleviate stress during folding while enhancing rigidity and impact resistance of the display apparatus.

The plate top may be disposed between the back plate and the plate bottom. The plate top is formed of a material having a high rigidity, so that the rigidity of the display panel can be reinforced. In addition, the plate top may prevent a phenomenon in which the opening pattern of the plate bottom is visually recognized through the display panel.

For example, the plate top and the plate bottom may be formed of a metallic material such as stainless steel (SUS), Invar, aluminum or magnesium, or a plastic material such as polymethyl methacrylate (PMMA), polycarbonate (PC), polyvinyl alcohol (PVA), acrylonitrile-butadiene-styrene (ABS), polyethylene terephthalate (PET), silicone or polyurethane (PU), or the like.

The polarizing plate 150 may be disposed over the display panel PNL. The polarizing plate 150 may uniformly transmit light to the outside without lowering luminance of light emitted from the display panel, and may absorb or reflect external light to thereby improve display quality.

The cover member CW is disposed on the polarizing plate 150. The cover member CW may protect the display panel PNL from external impacts and may prevent deterioration of the organic light emitting element 140 due to external air such as moisture or oxygen. The cover member CW may include a cover window 160 and may include at least one functional layer 170 as necessary.

For example, the cover window 160 may be a cover plastic formed of a transparent resin or a thin cover glass (TCG). Among these, the thin cover glass has advantages of a high strength, high impact resistance, and excellent surface hardness while having superior optical characteristics than cover plastic.

For example, the functional layer 170 may be one or more of a shatter-resistant layer (or shatter proof layer), a hard coating layer, an anti-fingerprint layer, an anti-reflection layer, an anti-pollution layer, an anti-glare layer, a viewing angle control layer, and an anti-static layer. The functional layer 170 may be disposed above, below, or both above and below the cover window 160.

For example, a shatter-resistant layer may be disposed on an upper surface of the cover window 160. The shatter-resistant layer may act as a buffer to protect lower components such as the cover window 160 from external impacts, and prevent fragments from scattering when damage occurs. For example, the shatter-resistant layer may be formed of polyurethane, silicone-based resin, polybutylalcohol, or the like, but embodiments of the present disclosure are not limited thereto. For example, the shatter-resistant layer may be formed by forming a shatter-resistant coating on the cover window 160. In some embodiments of the present disclosure, the shatter-resistant layer may be formed by attaching a shatter-resistant film on the cover window 160.

The display apparatus 100 includes at least one adhesive layer to bond (or attach) various components constituting the display apparatus 100. For example, the display apparatus 100 includes the first adhesive layer Adh1 and the second adhesive layer Adh2. The first adhesive layer Adh1 is disposed between the polarizing plate 150 and the cover member CW to bond the polarizing plate 150 and the cover member CW. The second adhesive layer Adh2 is disposed between the display panel PNL and the polarizing plate 150 to bond the display panel PNL and the polarizing plate 150.

When the functional layer 170 disposed above and/or below the cover window 160 is in the form of a film, an adhesive layer may be additionally disposed to bond the cover window 160 and the functional layer 170. For example, to bond the cover window 160 and the functional layer 170, a third adhesive layer Adh3 may be disposed therebetween.

At least one of the first adhesive layer Adh1, the second adhesive layer Adh2, and the third adhesive layer Adh3 may include the adhesive member according to embodiments of the present disclosure. Meanwhile, an adhesive layer that does not include the adhesive member according to embodiments of the present disclosure among the first adhesive layer Adh1, the second adhesive layer Adh2, and the third adhesive layer Adh3 may include one or more adhesives of an optically cleared adhesive, an optically cleared resin, and a pressure sensitive adhesive. For example, at least one of the first adhesive layer Adh1 and the second adhesive layer Adh2 may include the adhesive member according to some embodiments of the present disclosure. As described above, the adhesive member of the present disclosure may simultaneously satisfy folding characteristics and adhesion reliability within a wide temperature range ranging from low temperature to high temperature. Accordingly, when bonding components that are relatively vulnerable to folding stress, the adhesive member in some embodiments of the present disclosure may be more advantageously applied. In this aspect, the adhesive member according to some embodiments of the present disclosure may be included between the display panel PNL and the polarizing plate 150 and between the polarizing plate 150 and the cover member CW, relatively vulnerable to folding stress.

When implementing a foldable display apparatus, each of the first adhesive layer Adh1, the second adhesive layer Adh2, and the third adhesive layer Adh3 may include the adhesive member according to some embodiments of the present disclosure, but embodiments of the present disclosure are not limited thereto. Hereinafter, for convenience of description, the first adhesive layer Adh1, the second adhesive layer Adh2, and the third adhesive layer Adh3 are all formed of the adhesive member according to some embodiments of the present disclosure as an example. Accordingly, redundant descriptions will be omitted.

Each of the first adhesive layer Adh1, the second adhesive layer Adh2, and the third adhesive layer Adh3 is formed of an adhesive member that includes 100 parts by weight of an acrylic copolymer including a first repeating unit having a glass transition temperature of $-50°$ C. or less, a second repeat unit having a glass transition temperature of $-45°$ C. to $-10°$ C. and a third repeating unit having a glass transition temperature of $90°$ C. or more, the acrylic copolymer having a degree of crosslinking of 55% to 65%; 5 to 20 parts by weight of an elastomer based on 100 parts by weight of the acrylic copolymer, and 5 to 20 parts by weight of an inorganic nanofiller based on 100 parts by weight of the acrylic copolymer.

The adhesive member having the above composition has a shear storage modulus of $5 \times 10^4$ Pa to $5 \times 10^5$ Pa in a temperature range of $-30°$ C. to $100°$ C., and has an average slope of $-0.5$ to $0$ in the temperature range of $-30°$ C. to $100°$ C. when temperature is an x-axis (° C.) and a dynamic shear storage modulus is a y-axis (KPa) in distribution of the storage modulus according to temperature, and there is little variation in modulus within a wide temperature range. For example, an average slope in a range in which the temperature is $-30°$ C. to $0°$ C. may be $-0.05$ to $0$, and an average slope in a range in which the temperature is $60°$ C. to $100°$ C. may be $-0.05$ to $0$. For example, an average slope may be substantially $0$ in each of temperature ranges of $-30°$ C. to $0°$ C. and the temperature range of $60°$ C. to $100°$ C. Accordingly, a folding characteristic at low temperature is excellent and adhesion is maintained high at a temperature of room temperature or more. Therefore, when the display apparatus 100 is folded, folding stress can be effectively alleviated, and during repeated folding, cracks may not be generated in bonded components or peeling (or delamination) between the bonded components may not occur, whereby the display apparatus 100 having excellent reliability may be provided.

In related art, in the case of a foldable display apparatus implemented in an in-folding method or having a smaller curvature, or using a cover member with a large thickness to improve impact resistance, folding stress applied to the display apparatus when folded is more significant, there is a problem that the folding stress cannot be satisfied at low temperature where the modulus of the adhesive member rapidly increases.

However, the display apparatus according to some embodiments of the present disclosure can easily alleviate folding stress by applying the above-described adhesive member to each of the first adhesive layer Adh1, the second adhesive layer Adh2, and the third adhesive layer Adh3. In this manner, folding reliability can be satisfied at low temperature. In addition, in the adhesive member described above, the modulus of the adhesive member at a temperature of room temperature or more is maintained high and thus, an adhesive characteristic thereof is excellent, so that cracks or peeling (or delamination) of components can be minimized. In addition, the above-described adhesive member can allow for minimization of foreign material defects such as an ooze-out during a bonding process by improving the modulus at a temperature of room temperature or more.

The adhesive members included in each of the first adhesive layer Adh1, the second adhesive layer Adh2, and the third adhesive layer Adh3 may have the same composition or different compositions. For example, in the case of implementing a foldable display apparatus, folding stresses applied to respective adhesive layers are different, so the composition of the adhesive member included in each of the first adhesive layer Adh1, the second adhesive layer Adh2, and the third adhesive layer Adh3 may be adjusted in consideration of the folding stress applied to each layer. In consideration of characteristics of upper and lower components, the folding stress applied during folding may increase in the order of the third adhesive layer Adh3, the second adhesive layer Adh2, and the first adhesive layer Adh1. It is preferable to use an adhesive member having a lower modulus than those of the second adhesive layer Adh2 and the third adhesive layer Adh3 and having a high creep strain and recovery rate, as the first adhesive layer Adh1 that is subjected to a relatively large folding stress. The physical characteristics of the adhesive member can be adjusted according to required physical characteristics by varying the contents of the acrylic copolymer, elastomer, and inorganic nanofiller constituting the adhesive member, the ratios of the repeating units constituting the acrylic copolymer, specific types of the monomers, and the degree of crosslinking.

A related art display apparatuses have not been able to satisfy both folding characteristics and adhesive characteristics at the same time due to variations in modulus according to temperature of the adhesive member. For example, a related art display apparatuses had problems that a folding characteristic at low temperature is not satisfied due to a rapid increase in the modulus of the adhesive member at low temperature, and at a temperature above room temperature, the modulus of the adhesive member decreases and adhesion is degraded to thereby causing peeling (or delamination) between bonded components. In addition, when components of the display apparatus were bonded by using the adhesive member, it was difficult to perform a process control due to a push-out of the adhesive member, and foreign material defects such as an ooze-out occurred.

Accordingly, in some embodiments of the present disclosure, the display panel, the polarizing plate, and the cover member are bonded (or attached) with an adhesive member that maintains a constant modulus in a wide temperature range ranging from low temperature to high temperature by decreasing a modulus at low temperature compared to a related art adhesive member and increasing a modulus at high temperature, whereby the problem described above can be solved. Accordingly, the display apparatus according to some embodiments of the present disclosure may satisfy both folding reliability and bonding reliability over a wide temperature range ranging from low temperature to high temperature. For example, the adhesive member according to some embodiments of the present disclosure has excellent folding characteristics by alleviating a rapid increase in modulus at low temperature, has improved adhesion reliability by increasing a high temperature modulus, has little variation in modulus within a wide temperature range ranging from low temperature to high temperature and has excellent recovery characteristics. And, it is possible to provide a display apparatus with excellent reliability over a wide temperature range by including the adhesive member described above.

Hereinafter, the effects of the present disclosure described above will be described in more detail through Examples and Experimental examples. The following examples are for illustration of the present disclosure, and the scope of the present disclosure is not limited by the following examples.

Example 1 to Example 6

1) Manufacture of Adhesive Members 2-ethylhexyl acrylate, 4-hydroxybutyl acrylate, and isobornyl acrylate were dissolved in methyl ethyl ketone which is a solvent, and an initiator was added thereto to prepare a monomer mixture. At this time, the content ratios of monomers for respective examples were adjusted as described in a table shown in FIG. 5. Next, isoprene methacrylate as a polyfunctional acrylate, which is a material for forming a crosslinked structure, was added to the monomer mixture. Next, the solution was heated and partially polymerized to form a pre-polymer. Next, methyl ethyl ketone was added thereto to dilute a pre-polymer solution, and silica nanoparticles and isobutylene (weight average molecular weight 1,000,000 g/mol) were added in parts by weight described in the table shown in FIG. 5 to thereby prepare a composition of an adhesive member. The composition of the adhesive member thus prepared was coated on a substrate to have a thickness of 25 μm and was heat-treated to evaporate a solvent, thereby manufacturing an adhesive member.

2) Manufacture of Display Apparatuses

A flexible organic light emitting display panel and a polarizing plate were prepared, and the display panel and the polarizing plate were bonded (or attached) to each other through a lamination process using the adhesive member. Next, after preparing a cover member, the cover member was bonded onto the polarizing plate by a lamination process using the adhesive member, thereby manufacturing display apparatuses having a structure as shown in FIG. 4.

Experimental Example 1 to Experimental Example 11

When manufacturing an adhesive member, with the exception that types and contents of monomers, types and contents of elastomers, and the degree of crosslinking were varied as shown in a table shown in FIG. 6, the adhesive member was manufactured in the same manner as in the above Examples and using this, a display apparatus having the same structure as in FIG. 4 was manufactured.

Experimental Example 12 to Experimental Example 17

When manufacturing an adhesive member, with the exception that types and contents of monomers, types and contents of elastomers, and the degree of crosslinking were varied as shown in a table shown in FIG. 7, the adhesive member was manufactured in the same manner as in the above Examples and using this, a display apparatus having the same structure as in FIG. 4 was manufactured.

Test Example

Physical characteristics for each of the Examples and Experimental Examples were measured as follows, and results thereof are shown in FIGS. 5 to 7. FIG. 5 is a table showing compositions and physical characteristic measurement results of the adhesive members according to Example 1 to Example 6. FIG. 6 is a table showing compositions and physical characteristic measurement results of adhesive members according to Experimental Example 1 to Experimental Example 11. FIG. 7 is a table showing compositions and physical characteristic measurement results of adhesive members according to Experimental Example 12 to Experimental Example 17.

In FIGS. 5 to 7, monomer A is 2-ethylhexyl acrylate, monomer B is 4-hydroxybutyl acrylate, monomer C is isobornyl acrylate, elastomer 1 is isobutylene, and elastomer 2 is a butylene-isoprene copolymer.

1) Evaluation of Adhesive Characteristics

Adhesion force by temperature (unit: kgf/in): 180° peeling strength was measured at each of temperatures of 25° C. and 60° C. using a universal tensile tester according to ASTM D3330-04 standard under a condition of a tensile velocity of 5 mm/min.

2) Evaluation of Folding Characteristics 2-1) Dynamic foldability at low temperature: While a process of folding and unfolding the display apparatus was repeated 50,000 times using bending test equipment under a condition of −30° C., if a crack or peeling occurred, the number of folding at that time was described and if not, it was marked as OK.

2-2) Dynamic foldability at room temperature: While a process of folding and unfolding the display apparatus was repeated 200,000 times at 25° C. using bending test equipment, if a crack or peeling occurred, the number of folding at that time was described and if not, it was marked as OK.

2-3) Dynamic foldability at high temperature: While a process of folding and unfolding the display apparatus was repeated 200,000 times at 80° C. using bending test equipment, if a crack or peeling occurred, the number of folding at that time was described and if not, it was marked as OK.

2-4) Static foldability: After folding the display apparatus, it was observed whether the folded display apparatus maintained a folded state without deformation, while storing the folded display apparatus under conditions of 60° C. and 90% relative humidity (RH). If the folding state was maintained for 240 hours, it was marked as OK, and if not, it was marked as NG.

With reference to FIGS. 5 to 7, it could be confirmed that the adhesive members according to Example 1 to Example 6 have an initial adhesive strength (25° C.) of 1.5 kgf/in to 1.8 kgf/in and an adhesive strength at high temperature (60° C.) of 1.0 kgf/in to 1.3 kgf/in, which are higher than those in Experimental Example 1 to Experimental Example 17, and confirmed that the adhesive strengths were not significantly lowered and maintained high as temperature goes from room temperature to high temperature.

In addition, it could be confirmed that the adhesive members according to Example 1 to Example 6 all satisfied folding characteristics at each of temperatures of −30° C., 25° C. and 80° C. In addition, it could be confirmed that the folding characteristics were maintained for 240 hours under high temperature and high humidity (60° C./RH90%) conditions, and from this, it could be confirmed that folding reliability was excellent. For example, Example 1 to Example 6 can simultaneously satisfy folding characteristics and adhesive characteristics within a temperature range ranging from low temperature to high temperature.

The adhesive members of Experimental Example 1 to Experimental Example 7 included only the acrylic copolymer, and in this case, it could be confirmed that an adhesive strength was considerably poorer compared to the Examples, and folding characteristics measured under various conditions were not satisfied. With reference to Experimental Example 8 to Experimental Example 11, it could be confirmed that even if an elastomer was further included, physical characteristics of the adhesive member were not improved, and both folding characteristics and adhesion were poor.

The adhesive member of Experimental Example 12 had a lower content of inorganic nanofiller compared to the Examples and had a degree of crosslinking of 50%, which was lower than those of the examples, and in this case, it could be confirmed that even if all of the acrylic copolymer, elastomer, and inorganic nanofiller were included, an adhesive strength was lower than those of the Examples, and all of the folding characteristics were not satisfied.

In cases of Experimental Example 13, the composition was the same as that of Example 1 but the degree of crosslinking is different therefrom, and in this case, it could be confirmed that an adhesive strength was improved to a level equal to that of Example 1 but folding characteristics were not satisfied under various temperature conditions.

In Experimental Example 15 and Experimental Example 16, the composition of the adhesive member was the same as that of Example 1 but the degree of crosslinking was 30% and 40%, respectively, which are considerably low, and in this case, it was confirmed that an adhesive strength was poor and folding characteristics were also not satisfied.

Experimental Example 17 had the same composition as the Example 1, but the degree of crosslinking was 70%, which is high, and in this case, it was confirmed that adhesion or folding characteristics were slightly increased compared to Experimental Example 15 with a low degree of crosslinking, but both an initial adhesive strength and a high temperature adhesive strength were poor compared to the Examples and folding characteristics were not satisfied.

An adhesive member according to some embodiments of the present disclosure will be described as follows.

An adhesive member according to some embodiments of the present disclosure comprises 100 parts by weight of an acrylic copolymer including a first repeating unit having a glass transition temperature of −50° C. or less, a second repeat unit having a glass transition temperature of −45° C. to −10° C., and a third repeating unit having a glass transition temperature of 90° C. or more, 5 to 20 parts by weight of an elastomer with respect to 100 parts by weight of the acrylic copolymer, and 5 to 20 parts by weight of an inorganic nanofiller with respect to 100 parts by weight of the acrylic copolymer, the acrylic copolymer has a degree of crosslinking of 55% to 65%.

According to some embodiments of the present disclosure, the acrylic copolymer may include 60% to 90% by weight of the first repeating unit, 5% to 25% by weight of the second repeating unit, and 5% to 25% by weight of the third repeating unit.

According to some embodiments of the present disclosure, the first repeating unit may include an alkyl acrylate-based compound.

According to some embodiments of the present disclosure, the alkyl acrylate-based compound may include one or more compounds of an alkyl acrylate-based compound including a linear alkyl group having 1 to 12 carbon atoms and an alkyl acrylate-based compound including a branched alkyl group having 3 to 12 carbon atoms.

According to some embodiments of the present disclosure, the second repeating unit may include a hydroxyalkyl (meth)acrylate-based compound.

According to some embodiments of the present disclosure, the hydroxyalkyl (meth)acrylate-based compound may include one or more compounds among 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate.

According to some embodiments of the present disclosure, the third repeating unit may include one or more compounds among an alkyl methacrylate-based compound, (meth)acrylic acid, and isobornyl acrylate.

According to some embodiments of the present disclosure, the alkyl methacrylate-based compound may include one or more compounds of an alkyl methacrylate-based compound including a linear alkyl group having 1 to 18 carbon atoms, and an alkyl methacrylate-based compound including a branched alkyl group having 3 to 12 carbon atoms.

According to some embodiments of the present disclosure, the acrylic copolymer includes a crosslinked structure introduced by a polyfunctional compound or a crosslinking agent among an epoxy-based crosslinking agent, an oxazoline-based crosslinking agent, an aziridine-based crosslinking agent, a carbodiimide-based crosslinking agent, and a metal chelate-based crosslinking agent.

According to some embodiments of the present disclosure, the elastomer has a weight average molecular weight of 1,000,000 g/mol or more.

According to some embodiments of the present disclosure, the elastomer may include an isobutylene-based homopolymer or copolymer.

According to some embodiments of the present disclosure, the isobutylene-based copolymer may include an isobutylene-isoprene copolymer.

According to some embodiments of the present disclosure, the inorganic nanofiller may include silica nanoparticles having an average particle diameter of 10 nm to 50 nm.

According to some embodiments of the present disclosure, the adhesive member may further include an additive including one or more of a coupling agent, a curing accelerator, a stabilizer, an antifoaming agent, an ultraviolet absorber, an antistatic agent, and a lubricant.

According to some embodiments of the present disclosure, the coupling agent may include a silane-based coupling agent.

According to some embodiments of the present disclosure, the adhesive member may have a storage modulus of $5 \times 10^4$ Pa to $5 \times 10^5$ Pa in a temperature range of $-30°$ C. to $100°$ C., and may have an average slope of $-0.5$ to 0 in the temperature range of $-30°$ C. to $100°$ C. when the storage modulus changes as a function of temperature, the storage modulus may be a value measured under conditions where a shear strain is 1%, a frequency is 1 Hz, and a ramp rate is $5°$ C./minute.

According to some embodiments of the present disclosure, the adhesive member may have an average slope of $-0.05$ to 0 in a temperature range of $-30°$ C. to $0°$ C. and may have an average slope of $-0.05$ to 0 in a temperature range of $60°$ C. to $100°$ C., when the storage modulus changes as a function of temperature.

According to some embodiments of the present disclosure, the adhesive member may have a recovery rate of 90% or more at each of temperatures of $-30°$ C., $25°$ C., and $100°$ C., and the recovery rate may be represented by Equation 1 below:

$$\text{Recovery rate} = (S1-S2)/S1 \times 100\% \qquad \text{Equation 1}$$

wherein S1 is a maximum creep strain (unit: %), when a maximum strain is applied by applying a shear stress to the adhesive member while gradually increasing the shear stress from 10 KPa to 50 KPa under a temperature condition to be measured and maintaining the maximum shear stress for 10 minutes, and S2 is a residual strain (unit: %) that remains unrecovered when the applied shear stress is removed, after the generation of the maximum creep strain.

A display apparatus according to some embodiments of the present disclosure comprises a display panel, a cover member disposed on the display panel, and at least one adhesive layer disposed between the display panel and the cover member and including an adhesive member, the adhesive member, the adhesive member includes 100 parts by weight of an acrylic copolymer including a first repeating unit having a glass transition temperature of $-50°$ C. or less, a second repeat unit having a glass transition temperature of $-45°$ C. to $-10°$ C., and a third repeating unit having a glass transition temperature of $90°$ C. or more, 5 to 20 parts by weight of an elastomer with respect to 100 parts by weight of the acrylic copolymer; and 5 to 20 parts by weight of an inorganic nanofiller with respect to 100 parts by weight of the acrylic copolymer, the acrylic copolymer has a degree of crosslinking of 55% to 65%.

According to some embodiments of the present disclosure, the display apparatus may further comprise a polarizing plate disposed between the display panel and the cover member; the at least one adhesive layer may include a first adhesive layer disposed between the cover member and the polarizing plate, a second adhesive layer disposed between the polarizing plate and the display panel, at least one of the first adhesive layer and the second adhesive layer may include the adhesive member.

According to some embodiments of the present disclosure, the cover member may include a cover window and a functional layer, the at least one adhesive layer may further include a third adhesive layer between the cover window and the functional layer, and the third adhesive layer may include the adhesive member.

According to some embodiments of the present disclosure, the adhesive member may have a storage modulus of $5 \times 10^4$ Pa to $5 \times 10^5$ Pa in a temperature range of $-30°$ C. to $100°$ C., and may have an average slope of $-0.5$ to 0 in the temperature range of $-30°$ C. to $100°$ C. when the storage modulus changes as a function of temperature, wherein the storage modulus may be a value measured under conditions where a shear strain is 1%, a frequency is 1 Hz, and a ramp rate is $5°$ C./minute.

According to some embodiments of the present disclosure, the acrylic copolymer may include 60% to 90% by weight of the first repeating unit, 5% to 25% by weight of the second repeating unit, and 5% to 25% by weight of the third repeating unit.

According to some embodiments of the present disclosure, the first repeating unit may include an alkyl acrylate-based compound, the second repeating unit may include a hydroxyalkyl (meth)acrylate-based compound, the third repeating unit includes one or more compounds among an alkyl methacrylate-based compound, (meth)acrylic acid, and isobornyl acrylate, and the elastomer may include an isobutylene-based homopolymer or copolymer, and the inorganic nanofiller may include silica nanoparticles having an average particle diameter of 10 nm to 50 nm.

According to some embodiments of the present disclosure, an adhesive composition comprises 100 parts by weight of an acrylic copolymer including a first repeating unit having a glass transition temperature of $-50°$ C. or less, a second repeat unit having a glass transition temperature of $-45°$ C. to $-10°$ C., and a third repeating unit having a glass transition temperature of $90°$ C. or more, 5 to 20 parts by weight of an elastomer with respect to 100 parts by weight of the acrylic copolymer, and 5 to 20 parts by weight of an inorganic nanofiller with respect to 100 parts by weight of the acrylic copolymer, the acrylic copolymer has a degree of crosslinking of 55% to 65%.

According to some embodiments of the present disclosure, the adhesive composition may further include a solvent.

According to some embodiments of the present disclosure, an adhesive member formed form that the adhesive composition comprises 100 parts by weight of an acrylic copolymer including a first repeating unit having a glass transition temperature of −50° C. or less, a second repeat unit having a glass transition temperature of −45° C. to −10° C., and a third repeating unit having a glass transition temperature of 90° C. or more, 5 to 20 parts by weight of an elastomer with respect to 100 parts by weight of the acrylic copolymer, and 5 to 20 parts by weight of an inorganic nanofiller with respect to 100 parts by weight of the acrylic copolymer, the acrylic copolymer has a degree of crosslinking of 55% to 65% and/or the adhesive composition may further include a solvent.

According to some embodiments of the present disclosure, an adhesive member comprises 100 parts by weight of an acrylic copolymer, 5 to 20 parts by weight of an elastomer with respect to 100 parts by weight of the acrylic copolymer, and 5 to 20 parts by weight of an inorganic nanofiller with respect to 100 parts by weight of the acrylic copolymer, the adhesive member has a storage modulus of 5×104 Pa to 5×105 Pa in a temperature range of −30° C. to 100° C., and has an average slope of −0.5 to 0 in the temperature range of −30° C. to 100° C. when the storage modulus as a function of temperature, wherein the storage modulus is a value measured under conditions where a shear strain is 1%, a frequency is 1 Hz, and a ramp rate is 5° C./minute.

According to some embodiments of the present disclosure, the adhesive member has an average slope of −0.05 to 0 in a temperature range of −30° C. to 0° C. and has an average slope of −0.05 to 0 in a temperature range of 60° C. to 100° C., when the storage modulus changes as a function of temperature.

According to some embodiments of the present disclosure, an adhesive composition comprises 100 parts by weight of an acrylic copolymer, 5 to 20 parts by weight of an elastomer with respect to 100 parts by weight of the acrylic copolymer, and 5 to 20 parts by weight of an inorganic nanofiller with respect to 100 parts by weight of the acrylic copolymer, the adhesive composition has a storage modulus of 5×104 Pa to 5×105 Pa in a temperature range of −30° C. to 100° C., and has an average slope of −0.5 to 0 in the temperature range of −30° C. to 100° C. when the storage modulus changes as a function of temperature, wherein the storage modulus is a value measured under conditions where a shear strain is 1%, a frequency is 1 Hz, and a ramp rate is 5° C./minute.

According to some embodiments of the present disclosure, the adhesive composition may further include a solvent.

According to some embodiments of the present disclosure, an adhesive member formed form that the adhesive composition comprises 100 parts by weight of an acrylic copolymer, 5 to 20 parts by weight of an elastomer with respect to 100 parts by weight of the acrylic copolymer, and 5 to 20 parts by weight of an inorganic nanofiller with respect to 100 parts by weight of the acrylic copolymer, the adhesive composition has a storage modulus of 5×104 Pa to 5×105 Pa in a temperature range of −30° C. to 100° C., and has an average slope of −0.5 to 0 in the temperature range of −30° C. to 100° C. when the storage modulus changes as a function of temperature, wherein the storage modulus is a value measured under conditions where a shear strain is 1%, a frequency is 1 Hz, and a ramp rate is 5° C./minute and/or the adhesive composition may further include a solvent.

It will be apparent to those skilled in the art that various modifications and variations can be made in the present disclosure without departing from the technical idea or scope of the disclosures. Thus, it may be intended that embodiments of the present disclosure covers the modifications and variations of the disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An adhesive member for manufacturing a display apparatus, the adhesive member comprising:
   100 parts by weight of a crosslinked acrylic copolymer consisting of a first repeating unit having a glass transition temperature of −50° C. or less, a second repeat unit having a glass transition temperature of −45° C. to −10° C., and a third repeating unit having a glass transition temperature of 90° C. or more;
   5 to 20 parts by weight of an elastomer with respect to 100 parts by weight of the acrylic copolymer, and a crosslinked structure formed by a polyfunctional-compound or a crosslinking agent; and
   5 to 20 parts by weight of an inorganic nanofiller with respect to 100 parts by weight of the acrylic copolymer,
   wherein:
   the acrylic copolymer has a degree of crosslinking of 55% to 65%;
   the third repeating unit is formed by comprising isobornyl acrylate; and
   the display apparatus is a bendable display apparatus or a foldable display apparatus;
   the crosslinking agent includes isoprene methacrylate; and
   the elastomer includes an isobutylene-isoprene copolymer.

2. The adhesive member of claim 1, wherein proportions of the repeating units in the acrylic copolymer are 60% to 90% by weight of the first repeating unit, 5% to 25% by weight of the second repeating unit, and 5% to 25% by weight of the third repeating unit.

3. The adhesive member of claim 1, wherein the first repeating unit is formed from an alkyl acrylate-based compound.

4. The adhesive member of claim 3, wherein the alkyl acrylate-based compound is at least one compound selected from the group consisting of an alkyl acrylate-based compound including a linear alkyl group having 1 to 12 carbon atoms and an alkyl acrylate-based compound including a branched alkyl group having 3 to 12 carbon atoms.

5. The adhesive member of claim 1, wherein the second repeating unit is formed from a hydroxyalkyl (meth)acrylate-based compound.

6. The adhesive member of claim 5, wherein the hydroxyalkyl (meth)acrylate-based compound is at least one compound selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate.

7. The adhesive member of claim 1, wherein the alkyl methacrylate-based compound includes one or more compounds among an alkyl methacrylate-based compound including a linear alkyl group having 1 to 18 carbon atoms, and an alkyl methacrylate-based compound including a branched alkyl group having 3 to 12 carbon atoms.

8. The adhesive member of claim 1, wherein the elastomer has a weight average molecular weight of 1,000,000 g/mol or more.

9. The adhesive member of claim 1, wherein the inorganic nanofiller includes silica nanoparticles having an average particle diameter of 10 nm to 50 nm.

10. The adhesive member of claim 1, further comprising an additive including one or more of a coupling agent, a curing accelerator, a stabilizer, an antifoaming agent, an ultraviolet absorber, an antistatic agent, and a lubricant.

11. The adhesive member of claim 10, wherein the coupling agent includes a silane-based coupling agent.

12. The adhesive member of claim 1, wherein the adhesive member has a storage modulus of $5 \times 10^4$ Pa to $5 \times 10^5$ Pa in a temperature range of $-30°$ C. to $100°$ C., and has an average slope of $-0.5$ to 0 in the temperature range of $-30°$ C. to $100°$ C. when the storage modulus changes as a function of temperature,
wherein the storage modulus is a value measured under conditions where a shear strain is 1%, a frequency is 1 Hz, and a ramp rate is $5°$ C./minute.

13. The adhesive member of claim 12, wherein the adhesive member has an average slope of $-0.05$ to 0 in a temperature range of $-30°$ C. to $0°$ C. and has an average slope of $-0.05$ to 0 in a temperature range of $60°$ C. to $100°$ C., when the storage modulus changes as a function of temperature.

14. The adhesive member of claim 1, wherein the adhesive member has a recovery rate of 90% or more at each of temperatures of $-30°$ C., $25°$ C., and $100°$ C., and the recovery rate is represented by Equation 1 below:

$$\text{Recovery rate} = (S1-S2)/S1 \times 100\% \qquad \text{Equation 1}$$

wherein S1 is a maximum creep strain (%) when a maximum strain is applied by applying a shear stress to the adhesive member while gradually increasing the shear stress from 10 KPa to 50 KPa under a temperature condition to be measured and maintaining the maximum shear stress for 10 minutes, and S2 is a residual strain (%) that remains unrecovered when the applied shear
stress is removed, after the generation of the maximum creep strain.

* * * * *